US012106778B2

(12) United States Patent
Liu et al.

(10) Patent No.: US 12,106,778 B2
(45) Date of Patent: Oct. 1, 2024

(54) MULTIMEDIA RESOURCE CLIPPING METHOD AND APPARATUS, DEVICE AND STORAGE MEDIUM

(71) Applicant: BEIJING ZITIAO NETWORK TECHNOLOGY CO., LTD., Beijing (CN)

(72) Inventors: Xiaorong Liu, Beijing (CN); Ziyun Chen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/471,469

(22) Filed: Sep. 21, 2023

(65) Prior Publication Data

US 2024/0013808 A1    Jan. 11, 2024

Related U.S. Application Data

(63) Continuation of application No. PCT/CN2022/083048, filed on Mar. 25, 2022.

(30) Foreign Application Priority Data

Mar. 26, 2021    (CN) .......................... 202110325449.5

(51) Int. Cl.
G11B 27/031    (2006.01)
G06F 3/04845    (2022.01)

(52) U.S. Cl.
CPC ........ G11B 27/031 (2013.01); G06F 3/04845 (2013.01)

(58) Field of Classification Search
CPC .......................... G11B 27/031; G06F 3/04845
See application file for complete search history.

(56) References Cited

U.S. PATENT DOCUMENTS 10,628,185 B1    4/2020   Gupta et al.
10,818,058 B1    10/2020  Gupta et al.
(Continued)

FOREIGN PATENT DOCUMENTS

CN    108900897 A    11/2018
CN    109819179 A    5/2019
(Continued)

OTHER PUBLICATIONS

International Search Report (with English translation) and Written Opinion issued in PCT/CN2022/083048, dated Jun. 16, 2022, 12 pages provided.

(Continued)

Primary Examiner — Mishawn N. Hunter
(74) Attorney, Agent, or Firm — HSML P.C.

(57) ABSTRACT

A method for editing a multimedia resource includes: playing a first video bound with an initial editing draft, wherein the first video shows a process of producing the initial editing draft, and the initial editing draft indicates an initial editing operation for an original multimedia material; and displaying a multimedia-resource-editing operation page according to a target editing draft, in response to an editing triggering operation for the first video, where the target editing draft is obtained based on the initial editing draft, the target editing draft indicates a target editing operation for a target material, the target material corresponds to all or a part of the original multimedia material, and the target editing operation comprises all or a part of the initial editing operation.

17 Claims, 8 Drawing Sheets

(56) References Cited

U.S. PATENT DOCUMENTS

| | | | | |
|---|---|---|---|---|
| 2010/0054706 A1* | 3/2010 | McCrossan | ........ | G11B 20/1262 |
| | | | | 348/565 |
| 2013/0129316 A1* | 5/2013 | Dontcheva | ............. | G11B 27/34 |
| | | | | 386/E9.011 |
| 2021/0027510 A1 | 1/2021 | Avoyan et al. | | |
| 2021/0042351 A1 | 2/2021 | Moore et al. | | |
| 2021/0264952 A1 | 8/2021 | Zhu et al. | | |
| 2022/0005508 A1 | 1/2022 | Huang | | |
| 2022/0044026 A1 | 2/2022 | Huang | | |
| 2022/0358966 A1 | 11/2022 | Wang et al. | | |
| 2023/0144094 A1 | 5/2023 | Wu et al. | | |
| 2023/0343233 A1 | 10/2023 | He | | |

FOREIGN PATENT DOCUMENTS

| | | | |
|---|---|---|---|
| CN | 111243632 A | 6/2020 | |
| CN | 111246300 A | 6/2020 | |
| CN | 112073649 A | 12/2020 | |
| CN | 113079405 A | 7/2021 | |
| EP | 4258133 A1 | 10/2023 | |
| JP | 2022541186 A | 9/2022 | |
| WO | 2016128984 A1 | 8/2016 | |

OTHER PUBLICATIONS

Decision of Grant issued in Japanese Application No. 2023-558964, dated May 21, 2024, with machine translation.
The extended European search report issued in European Application No. 22774345.7.

* cited by examiner

MULTIMEDIA RESOURCE CLIPPING METHOD AND APPARATUS, DEVICE AND STORAGE MEDIUM

The present application is a continuation of International Application No. PCT/CN2022/083048, filed on Mar. 25, 2022 which claims priority to Chinese Patent Application No. 202110325449.5, titled "MULTIMEDIA RESOURCE CLIPPING METHOD AND APPARATUS, DEVICE AND STORAGE MEDIUM", filed on Mar. 26, 2021 with the China National Intellectual Property Administration, both of which are incorporated herein by reference in their entireties.

FIELD

The present disclosure relates to the field of data processing, and in particular to a method and an apparatus for editing multimedia resources, a device and a storage medium.

BACKGROUND

With the continuous development of the technology for editing multimedia resources, users require better functions of editing multimedia resources. However, most users do not have skills of editing multimedia resources. Therefore, how to lower a threshold of editing multimedia resources to enable most users to edit multimedia resources is a technical problem required to be solved urgently.

SUMMARY

In order to solve or at least partially solve the above technical problem, a method and an apparatus for editing multimedia resources, a device and a storage medium are provided according to the present disclosure, to easily edit multimedia resources based on an initial editing draft bound to a first video, which lowers a threshold of editing multimedia resources, thereby improving user experience in editing multimedia resources.

In a first aspect, a method for editing a multimedia resource is provided according to the present disclosure. The method includes:
  playing a first video bound with an initial editing draft, where the first video shows a process of producing the initial editing draft, and the initial editing draft indicates an initial editing operation for an original multimedia material; and
  displaying a multimedia-resource-editing operation page according to a target editing draft, in response to an editing triggering operation for the first video, where the target editing draft is obtained based on the initial editing draft, the target editing draft indicates a target editing operation for a target material, the target material corresponds to all or a part of the original multimedia material, and the target editing operation includes all or a part of the initial editing operation.

In an embodiment, the method further includes:
  playing a second video, where the second video is not bound with the initial editing draft, and the second video indicates an editing operation for a multimedia material; and
  playing the second video in a form of a floating window on the multimedia-resource-editing operation page, in response to an editing triggering operation for the second video.

In an embodiment, the displaying a multimedia-resource-editing operation page according to a target editing draft, in response to the editing triggering operation for the first video, includes:
  determining whether the initial editing draft is used, in response to the editing triggering operation for the first video;
  displaying a multimedia-material selection page, in a case of determining that the initial editing draft is used;
  replacing the original multimedia material in the initial editing draft with a multimedia material corresponding to a selection operation, in response to receiving the selection operation for a multimedia material displayed on the multimedia-material selection page, to obtain the target editing draft, where there is a correspondence between the multimedia material corresponding to the selection operation and the original multimedia material; and
  displaying the multimedia-resource-editing operation page according to the target editing draft.

In an embodiment, the method further includes: playing the first video in a form of a floating window on the multimedia-resource-editing operation page, in a case of determining that the initial editing draft is not used, where the first video instructs a user to perform an editing operation on a multimedia-resource editing page.

In an embodiment, before replacing the original multimedia material in the initial editing draft with a multimedia material corresponding to a selection operation, in response to receiving the selection operation for a multimedia material displayed on the multimedia-material selection page, to obtain the target editing draft, the method further includes:
  displaying the number of selected multimedia material on the multimedia-material selection page; where the number of the selected multimedia material is determined based on the number of the original multimedia material included in the initial editing draft, and the number of the selected multimedia material indicates the number of the multimedia material selected by the user.

In an embodiment, the first video bound with the initial editing draft is posted based on a binding relationship between the first video and the initial editing draft.

In an embodiment, after the displaying the multimedia-resource-editing operation page according to the target editing draft, the method further includes: receiving an adjustment operation for at least one of the target material and the target editing operation, on the multimedia-resource-editing operation page.

In a second aspect, an apparatus for editing a multimedia resource is provided according to the present disclosure. The apparatus includes a first playing module and a first display module.

The first playing module is configured to play a first video bound with an initial editing draft, where first video shows a process of producing the initial editing draft, and the initial editing draft indicates an initial editing operation for an original multimedia material.

The first display module is configured to display a multimedia-resource-editing operation page according to a target clip draft, in response to an editing triggering operation for the first video, where the target editing draft is obtained based on the initial editing draft, the target editing draft indicates a target editing operation for a target material, the target material corresponds to all or a part of the original multimedia material, and the target editing operation includes all or a part of the initial editing operation.

In a third aspect, a computer-readable storage medium is provided according to the present disclosure. The computer-readable storage medium stores instructions, and the instructions, when executed by a terminal device, cause the terminal device to perform the method described above.

In a fourth aspect, a device is provided according to the present disclosure. The device includes a memory, a processor and a computer program stored in the memory and executable on the processor. The processor, when executing the computer program, performs the method described above.

In a fifth aspect, a computer program product is provided according to the present disclosure. The computer program product includes a computer program or instructions. The computer program or instructions, when executed by a processor, performs the method described above.

The technical solutions according to the embodiments of the present disclosure have the following advantages compared with the conventional technology.

A method for editing a multimedia resource is provided according to an embodiment of the present disclosure. A first video bound with an initial editing draft is first played. The first video shows a process of producing the initial editing draft, and the initial editing draft indicates an initial editing operation for an original multimedia material. Then, a multimedia-resource-editing operation page is displayed according to a target editing draft in response to an editing triggering operation for the first video. The target editing draft is obtained based on the initial editing draft. The target editing draft indicates a target editing operation for a target material. The target material corresponds to all or part of the original multimedia material, and the target editing operation includes all or part of the initial editing operation. In the embodiments of the present disclosure, multimedia resources can be edited easily based on the initial editing draft bound with the first video, which lowers a threshold of editing the multimedia resource, thereby improving user experience in editing multimedia resources.

BRIEF DESCRIPTION OF THE DRAWINGS

The drawings herein are incorporated into the specification and constitute a part of the specification, which show embodiments of the present disclosure. The drawings and the specification are used to explain the principle of the present disclosure.

In order to more clearly explain the embodiments of the present disclosure or the technical solutions in the conventional technology, the drawings used in the description of the embodiments or the conventional technology are briefly introduced below. Apparently, for those skilled in the art, other drawings may be obtained according to the provided drawings without any creative effort.

DETAILED DESCRIPTION OF EMBODIMENTS

In order to make the above purposes, features, and advantage of the present disclosure clearly to be understood, technical solutions in the present disclosure are described hereinafter. It should be noted that the embodiments of the present disclosure and the features in the embodiments may be combined with each other in a case of no conflict.

Although many specific details are set forth in the following description to facilitate a full understanding of the present disclosure, the present disclosure may be implemented in other ways than those described herein. Apparently, the embodiments in the specification are only some of, rather than all, embodiments of the present disclosure.

With the continuous development of computer technology, multimedia resource no longer can be edited only by professional editors, which is a trend to be edited by ordinary people.

Most users do not have skills of editing the multimedia resources. Therefore, how to lower a threshold of editing the multimedia resources to enable most users to participate in multimedia resource editing and produce the productions meeting their own requirements is a technical problem to be solved urgently.

In view of this, a method for editing a multimedia resource is provided according to an embodiment of the present disclosure. A first video bound with an initial editing draft is first played. The first video shows a process of producing the initial editing draft, and the initial editing draft indicates an initial editing operation for an original multimedia material. Then, a multimedia-resource-editing operation page is displayed according to a target editing draft in response to an editing triggering operation for the first video. The target editing draft is obtained based on the initial editing draft. The target editing draft indicates a target editing operation for a target material. The target material corresponds to all or part of the original multimedia material, and the target editing operation includes all or part of the initial editing operation.

Thus, in the embodiments of the present disclosure, multimedia resources can be edited easily based on the initial editing draft bound with the first video, which lowers a threshold of editing multimedia resources, thereby improving user experience in editing the multimedia resources.

Figure 1:
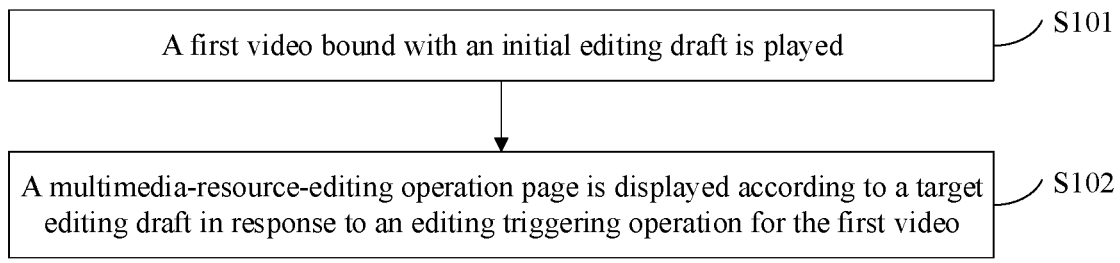
FIG. 1 is a flowchart of a method for editing a multimedia resource according to an embodiment of the present disclosure.

A method for editing a multimedia resource is provided according to an embodiment of the present disclosure based on this. Referring to FIG. 1, which is a flowchart of a method for editing multimedia resources according to an embodiment of the present disclosure. The method includes the following steps S101 and S102.

In step S101, a first video bound with an initial editing draft is played.

The first video shows a process of producing the initial editing draft, and the initial editing draft indicates an initial editing operation for an original multimedia material.

The multimedia resource in an embodiment of the disclosure may include a video resource, an audio resource, an image resource, and the like. The method for editing the multimedia resource according to the embodiments of the disclosure is applicable to editing the video resource, the audio resource, the image resource, and the like. For ease of understanding, a scenario in which the method is applied to editing the video resource is described in the embodiments of the present disclosure.

In an embodiment of the present disclosure, the first video may be a tutorial video, and the initial editing draft bound with the first video may be a finished product obtained by editing the multimedia resource. Specifically, the tutorial video shows a process of editing the multimedia resource to obtain the finished product. A work having the same or similar editing effect as the finished product can be obtained, by performing an editing operation based on the editing process shown in the tutorial video.

In an embodiment of the present disclosure, the initial editing draft indicates an initial editing operation for the original multimedia material. The original multimedia material may include a video material and/or an audio material. The initial editing operation may include an editing operation such as a cutting operation and a splicing operation, performed on the video material and/or the audio material in the original multimedia material. The initial editing operation may further include an effect editing operation such as an editing operation of adding a sticker or text, and an editing operation of applying a filter, performed on the video material. The initial editing operation may further include an effect editing operation such as an editing operation of adding a sound effect, performed on the audio material.

In step S102, a multimedia-resource-editing operation page is displayed according to a target editing draft in response to an editing triggering operation for the first video.

The target editing draft is obtained based on the initial editing draft, and the target editing draft indicates a target editing operation for a target material. The target material corresponds to all or part of the original multimedia material, and the target editing operation includes all or part of the initial editing operation.

In an embodiment of the present disclosure, in a process of displaying the first video bound with the initial editing draft, if the editing triggering operation for the first video is received, the target editing draft may be obtained based on the initial editing draft. Then the multimedia-resource-editing operation page is displayed according to the target editing draft. Specifically, an editing operation may be performed on the target editing draft, on the multimedia-resource-editing operation page.

In practice, the target editing draft indicates a target editing operation for the target material. The multimedia-resource-editing operation page is displayed according to the target editing draft. Specifically, the target material operation and the target editing operation that are indicated by the target editing draft are displayed on the multimedia-resource-editing operation page. A user may adjust the target material and/or the target editing operation on the multimedia-resource-editing operation page, to obtain a multimedia editing production that meets requirements.

The target material in the embodiments of the present disclosure corresponds to all or part of the original multimedia material in the initial editing draft.

In an implementation, the target material includes a target video material corresponding to the original video material in the initial editing operation, and/or target audio material corresponding to the original audio material in the initial editing operation.

Specifically, the target video material may be an original video material in the initial editing operation, or a user's video material which is used to replace the original video material. The target audio material may be an original audio material in the initial editing operation, or a user's audio material which is used to replace the original audio material. In addition, the target material may include only the target video material or only the target audio material.

In the method for editing the multimedia resource according to the embodiments of the present disclosure, a first video bound with an initial editing draft is first played. The first video shows a process of producing the initial editing draft, and the initial editing draft indicates an initial editing operation for an original multimedia material. Then, a multimedia-resource-editing operation page is displayed according to a target editing draft in response to an editing triggering operation for the first video. The target editing draft is obtained based on the initial editing draft. The target editing draft indicates a target editing operation for a target material. The target material corresponds to all or part of the original multimedia material, and the target editing operation includes all or part of the initial editing operation. Thus, in the embodiments of the present disclosure, multimedia resources can be edited easily based on the initial editing draft bound with the first video, which lowers a threshold of editing the multimedia resource, thereby improving user experience in editing multimedia resources.

A method for editing a multimedia resource is further provided according to another embodiment of the present disclosure based on the above embodiments. Specifically, a second video bound to no initial editing draft is played in a form of a floating window on the multimedia-resource-editing operation page. When viewing the second video, the user may edit the multimedia resource based on an editing operation for the multimedia resource indicated by the second video, on the multimedia-resource-editing operation page.

In practice, the second video is played first. The second video is played in a form of a floating window on the multimedia-resource-editing operation page in response to an editing triggering operation for the second video.

In the method for editing the multimedia resource according to an embodiment of the present disclosure, on the basis of editing the multimedia resource based on the first video bound with the initial editing draft, the user may further edit the multimedia resource while viewing a video indicating an editing operation, based on the second video bound with no initial editing draft, which enriches the function of multimedia editing, thereby further improving user experience in editing the multimedia resource.

Figure 2:
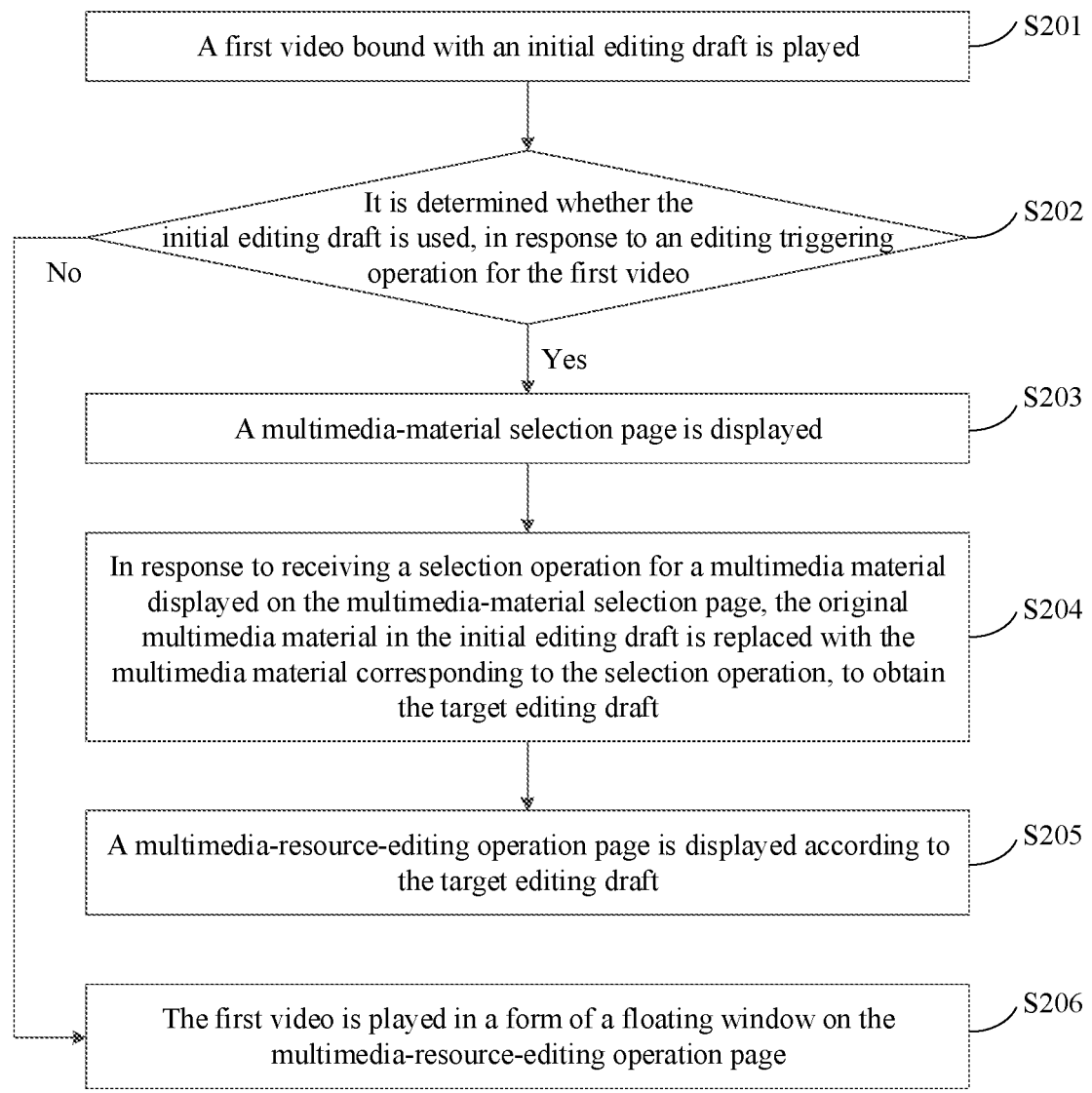
FIG. 2 is a flowchart of a method for editing a multimedia resource according to another embodiment of the present disclosure.

In order to facilitate the understanding of the method for editing the multimedia resource according to the embodiments of the present disclosure, an implementation of the method for editing the multimedia resource is provided according to an embodiment of the present disclosure. Referring to FIG. 2, which is a flowchart of a method for editing multimedia resources according to another embodiment of the present disclosure. The method includes the following steps S201 to S206.

In step S201, a first video bound with an initial editing draft is played.

The first video shows a process of producing the initial editing draft. The initial editing draft indicates an initial editing operation for an original multimedia material.

Figure 3:
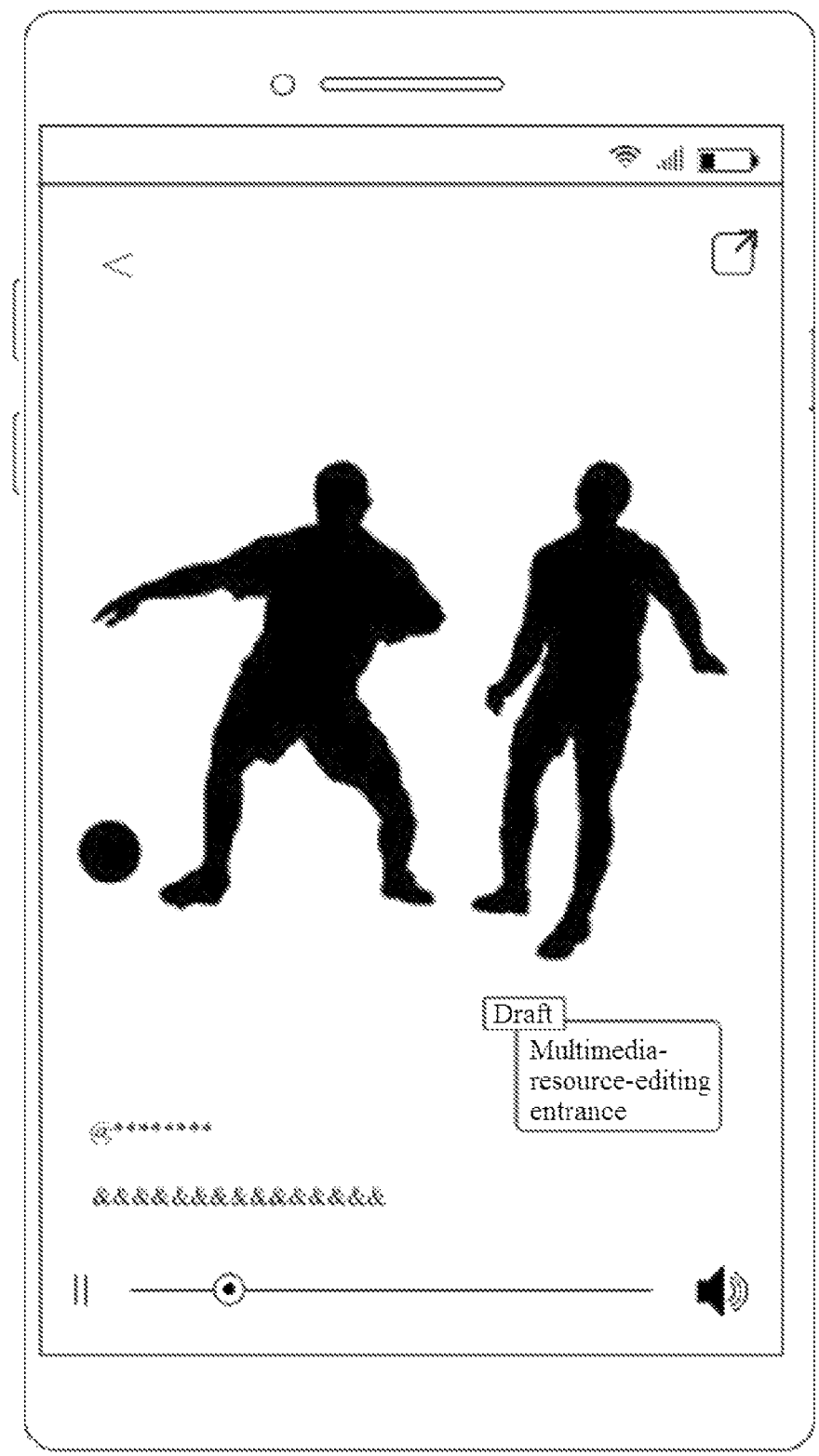
FIG. 3 is a schematic diagram of a page for displaying a first video according to an embodiment of the present disclosure.

In an implementation, the first video may belong to a video streaming recommended to a current user. A multimedia-resource-editing control may be arranged on a page for displaying the first video. The multimedia-resource-editing control is configured to trigger an editing operation for the first video. Reference is made to FIG. 3, which is a schematic diagram of a page for displaying the first video according to an embodiment of the present disclosure. The multimedia-resource-editing control may be arranged at any position of the page for displaying the first video. In addition, the user may drag the multimedia-resource-editing control, to change a position of the multimedia-resource-editing control based on requirements.

In an implementation, since the first video is bound with the initial editing draft, the multimedia-resource-editing control may be provided with a draft identifier, which is used to indicate that the first video is bound with the initial editing draft. In this way, the user may know that the first video currently played is bound with the initial editing draft. A form of the draft identifier is not limited in the embodiments of the present disclosure.

In step S202, it is determined whether the initial editing draft is used, in response to an editing triggering operation for the first video. The method proceeds to step S203 in the case of determining that the initial editing draft is used, and the method proceeds to step S206 in the case of determining that the initial editing draft is not used.

In the embodiments of the present disclosure, the editing triggering operation for the first video may be an operation of the user clicking the multimedia-resource-editing control on the page for displaying the first video.

In practice, it is first determined, in response to detecting the triggering operation of the user on the multimedia-resource-editing control, whether the user needs to import the original multimedia material in the initial editing draft bound with the first video.

Figure 4:
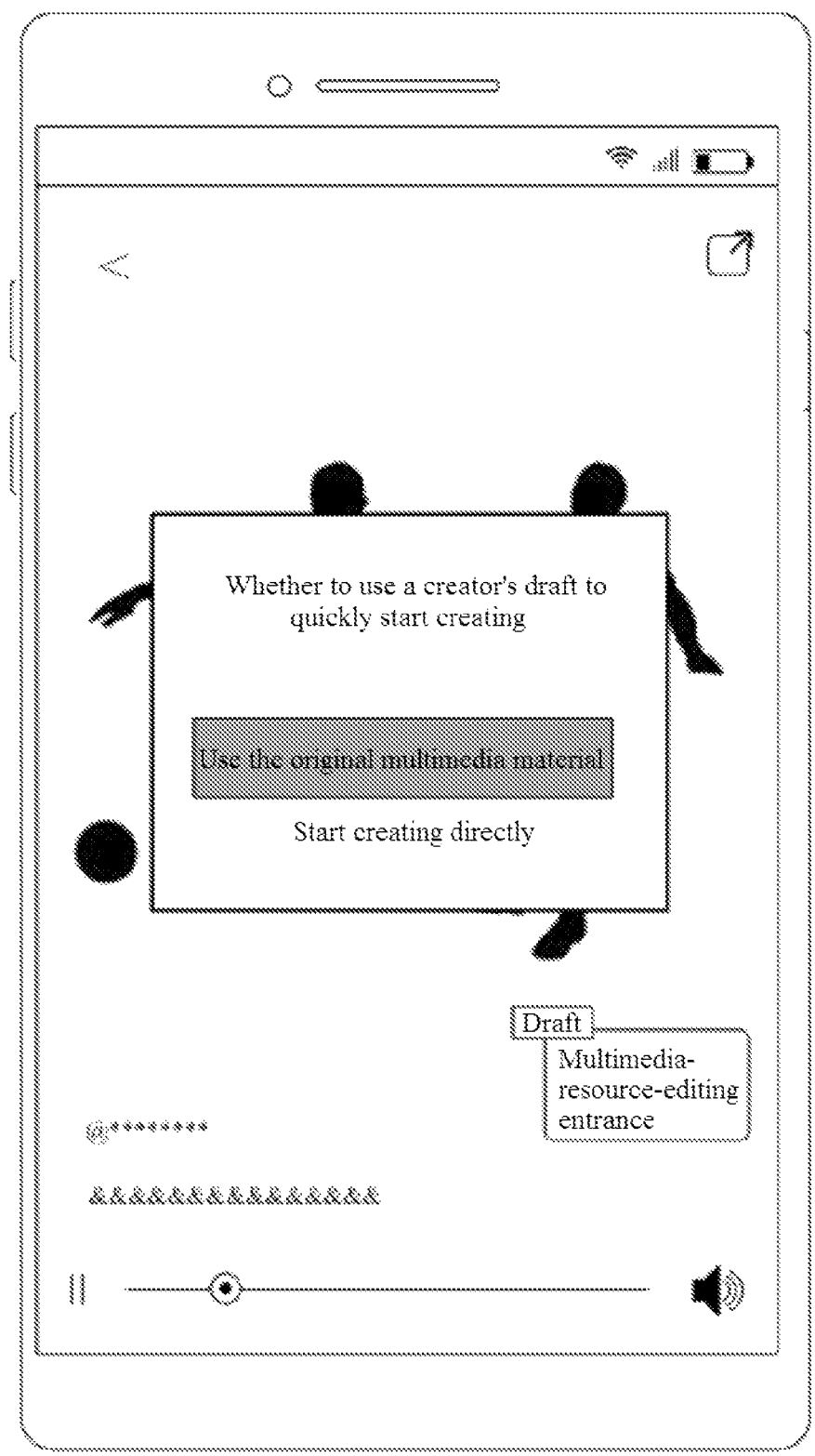
FIG. 4 is a schematic diagram of a multimedia-material determination window according to an embodiment of the present disclosure.

In an implementation, a window for determining whether the original multimedia material in the initial editing draft is imported may be provided for the user in a form of a pop-up window, in response to detecting the triggering operation of the user for the multimedia-resource-editing control. Reference is made to FIG. 4, which is a schematic diagram of a multimedia-material determination window according to an embodiment of the present disclosure. The multimedia-material determination window is provided with two entrances, which are an entrance of "use the original multimedia material" and an entrance of "start creating directly". The user selects one of the two entrances to determine whether the initial editing draft is used.

Specifically, if an operation of the user clicking the entrance of "Use the original multimedia material" on the multimedia-material determination window is received, it is determined to use the initial editing draft bound with the first video. If an operation of the user clicking the entrance of "start creating directly" on the multimedia-material determination window is received, it is determined that the initial editing draft bound with the first video is not used.

In step S203, a multimedia-material selection page is displayed.

In an embodiment of the present disclosure, the multimedia-material selection page is displayed for the user, in the case that the user determines to use the initial editing draft bound with the first video. In this way, the user may select a material for multimedia-resource editing, from user's multimedia material displayed on the multimedia-material selection page.

Figure 5:
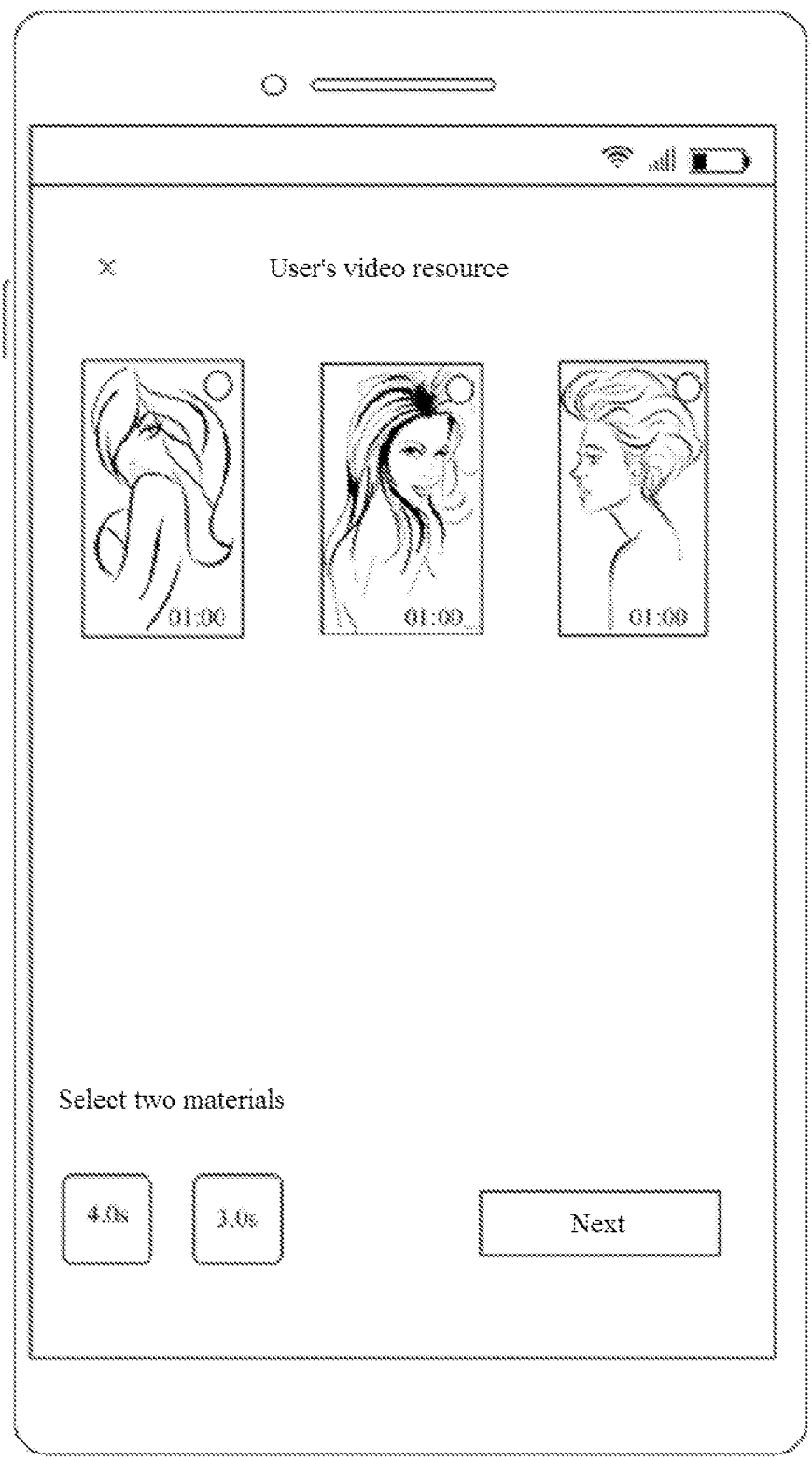
FIG. 5 is a schematic diagram of a multimedia-material selection page according to an embodiment of the present disclosure.

In an implementation, the multimedia-material selection page is jumped to, in response to receiving an operation of the user clicking the entrance of "use the original multimedia material" shown in FIG. 4. Reference is made to FIG. 5, which is a schematic diagram of a multimedia-material selection page according to an embodiment of the present disclosure. Current user's multimedia materials are displayed on the multimedia-material selection page. The user may select one or more multimedia materials for the multimedia-resource editing.

In an implementation, the number of selectable multimedia material may further be displayed on the multimedia-material selection page. As shown in FIG. 5, the number of selectable multimedia material displayed on the multimedia-material selection page is two, one of them is a video material with a length of 4.0 seconds, and the other is a video material with a length of 3.0 seconds. Based on the number of the displayed selectable multimedia material, the user may select the corresponding number of multimedia material from the multimedia material displayed on the multimedia-material selection page. In addition, a video clip with a length may be extracted from the selected multimedia material based on requirements. For example, a video clip with a length of 4.0 seconds may be extracted from the selected multimedia material, in correspondence to the video material with a length of 4.0 seconds. If the length of the selected multimedia material is less than 4.0 s, same content of the selected multimedia material may be spliced to obtain a video clip with the length of 4.0 seconds.

In an embodiment of the present disclosure, the number of the selected multimedia material displayed on the multimedia-material selection page may be determined based on the number of the original multimedia material included in the initial editing draft. For example, the number of the original video material included in the initial editing draft may be displayed on the multimedia-material selection page, so that the user selects the corresponding number of video materials. Specifically, the number of the selected multimedia material displayed on the multimedia-material selection page indicates the number of the multimedia material selected by the user.

In step S204, in response to receiving a selection operation for a multimedia material displayed on the multimedia-material selection page, the original multimedia material in the initial editing draft is replaced with the multimedia material corresponding to the selection operation, to obtain the target editing draft.

There is a correspondence between the multimedia material corresponding to the selection operation and the original multimedia material.

In an embodiment of the present disclosure, after the multimedia-material selection page is displayed, the user may click a multimedia material displayed on the multimedia-material selection page to determine the multimedia material which is used to replace the original multimedia material in the initial editing draft.

In an implementation, the original multimedia material in the initial editing draft is replaced with the multimedia material corresponding to the selection operation, in response to receiving an operation of the user triggering a "Next" control shown in FIG. 5, to obtain the target editing draft. The target editing draft indicates a target editing operation for a target material. The target material includes the multimedia material corresponding to the selection operation, and the target editing operation includes all or part of the initial editing operation in the initial editing draft.

In an implementation, the target editing draft differs from the initial editing draft in that the video material in the initial editing draft is replaced with the video material selected by the user. The initial editing operation in the initial editing draft is retained in the target editing draft.

In addition, the audio material in the initial editing draft may be deleted, that is, not included in the target editing draft. In other words, the target editing draft does not include the audio material.

In step S205, a multimedia-resource-editing operation page is displayed according to the target editing draft.

In an embodiment of the present disclosure, the multimedia-resource-editing operation page is displayed according to the target editing draft, after the target editing draft is obtained. Specifically, the target material and the target editing operation in the target editing draft are displayed on the multimedia-resource-editing operation page.

Figure 6:
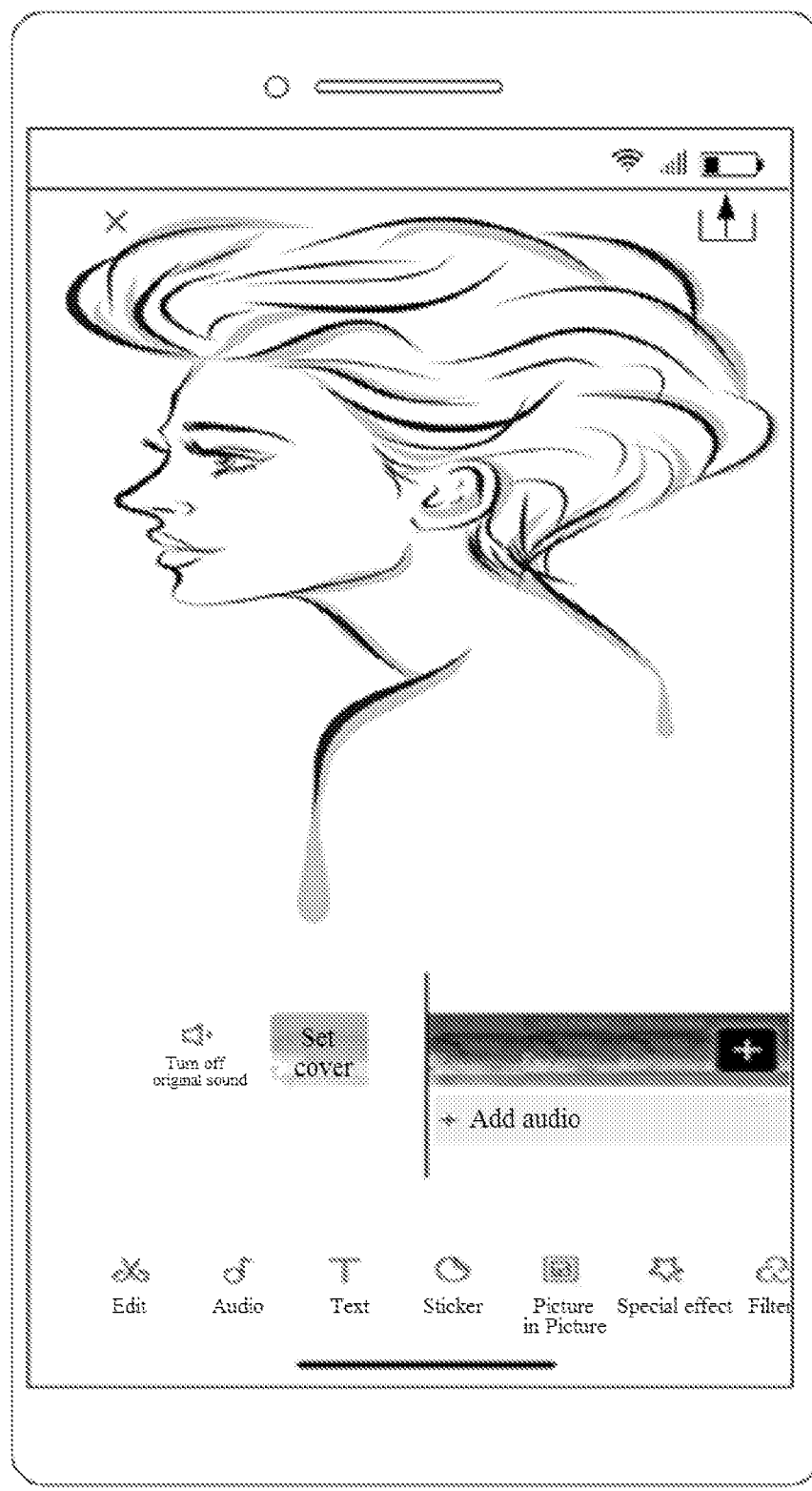
FIG. 6 is a schematic diagram of a multimedia-resource-editing operation page according to an embodiment of the present disclosure.

Reference is made to FIG. 6, which is a schematic diagram of a multimedia-resource-editing operation page according to an embodiment of the present disclosure. The target material in the target editing draft is displayed in a video-material display window, while the target editing operation indicated in the target editing draft is displayed in an editing operation area. The user may further edit the target editing draft, for example, adjusting the target material and/or the target editing operation, based on the content displayed on the multimedia-resource-editing operation page.

In step S206, the first video is played in a form of a floating window on the multimedia-resource-editing operation page. The first video instructs the user to perform an editing operation on the multimedia-resource editing operation page.

In an embodiment of the present disclosure, receiving an operation of the user clicking the entrance of "start create directly" shown in FIG. 4 indicates that the user determines that the initial editing draft bound with the first video is not used. Therefore, in the embodiments of the present disclosure, the multimedia-material selection page may be displayed for the user, so that the user may select a material required for the multimedia-resource editing.

Figure 7:
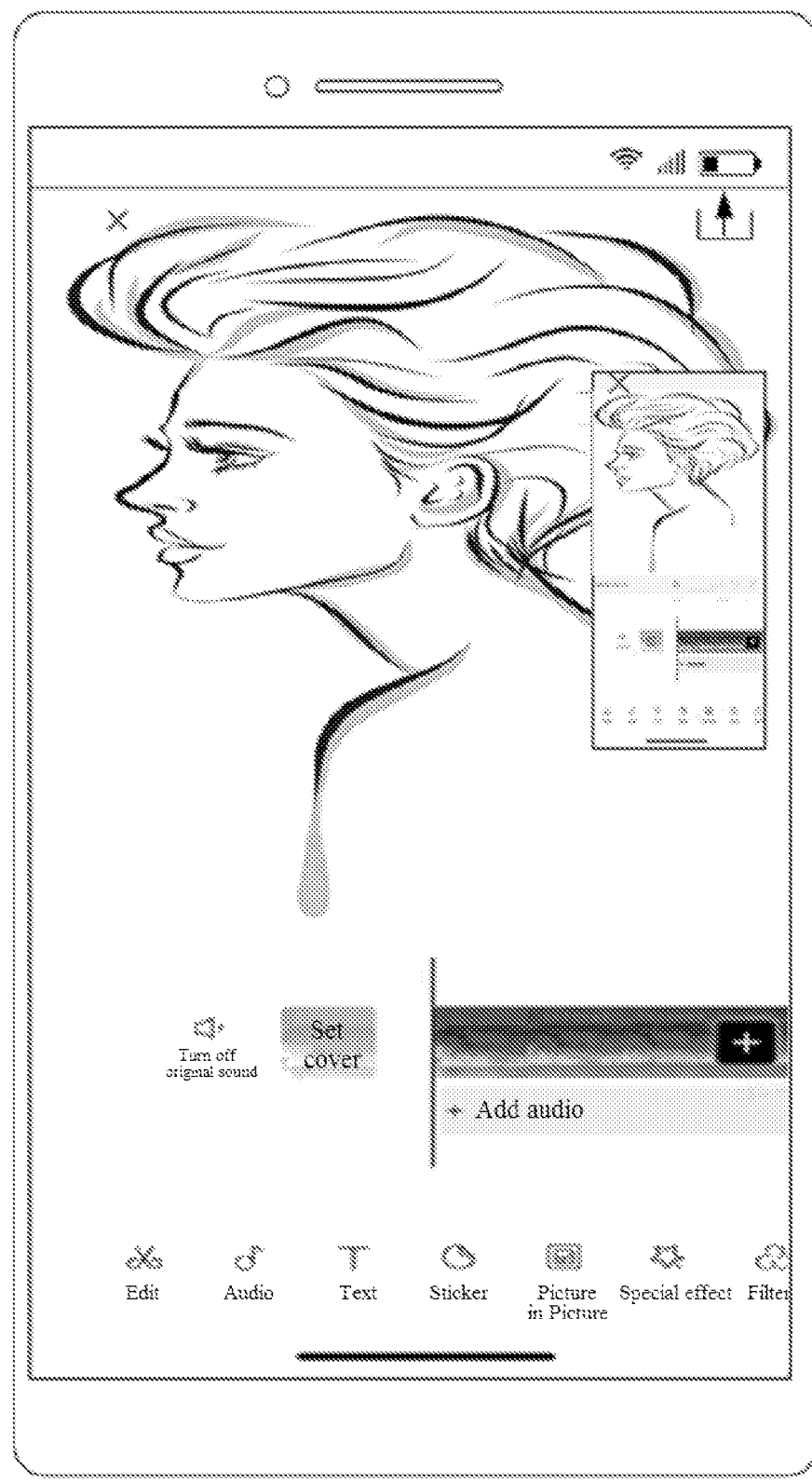
FIG. 7 is a schematic diagram of a multimedia-resource-editing operation page according to another embodiment of the present disclosure.

In practice, after the user selects the multimedia material, the multimedia-resource-editing operation page is jumped to and the first video is played in the form of the floating window on the multimedia-resource-editing operation page. Reference is made to FIG. 7, which is a schematic diagram of a multimedia-resource-editing operation page according to another embodiment of the present disclosure. The user edits the selected multimedia material, based on the editing operation indicated in the first video played in the form of the floating window.

With the method for editing the multimedia resource according to the embodiments of the present disclosure, the multimedia resource can be easily edited based on the initial editing draft bound with the first video. In addition, the user can easily edit the multimedia resources based on the editing operation indicated in the first video even if the initial editing draft is not used. Thus, in the embodiments of the present disclosure, the threshold of editing the multimedia resource can be lowered, thereby improving user experience in editing multimedia resource.

In practice, a video producer posts the first video bound with the initial editing operation, before the first video bound with the initial editing draft is displayed.

In an embodiment of the present disclosure, the first video is bound with the initial editing draft before the first video is posted. Then, the first video bound with the initial editing draft is posted based on the binding relationship between the first video and the initial editing draft.

Figure 8:
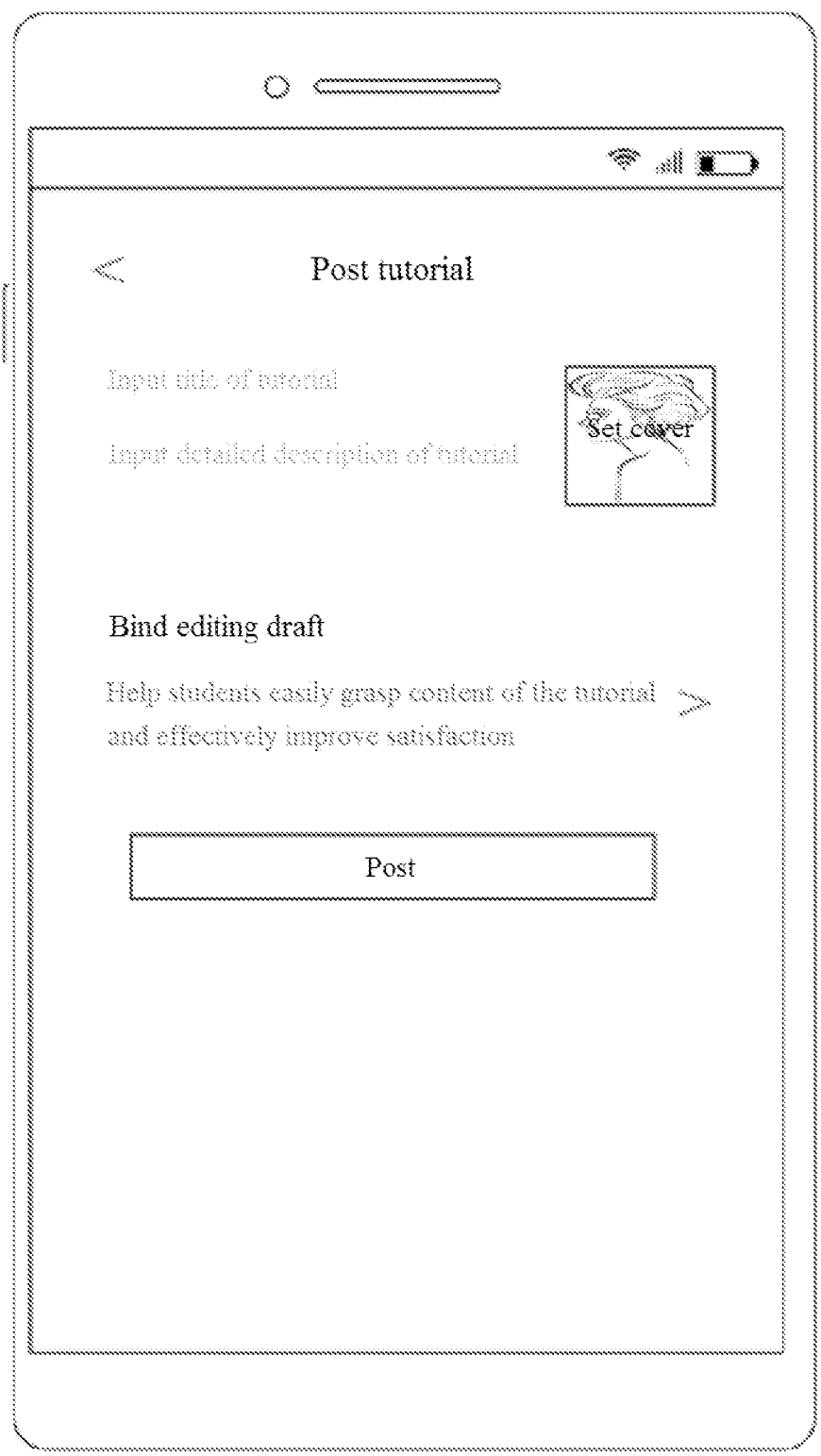
FIG. 8 is a schematic diagram of a tutorial posting page according to an embodiment of the present disclosure.

In an implementation, an entrance of "binding editing draft" is arranged on a tutorial posting page. Reference is made to FIG. 8, which is a schematic diagram of a tutorial posting page according to an embodiment of the present disclosure. An editing draft box of the current user is jumped to, in response to receiving an operation of the user triggering the entrance of "binding editing draft" on the tutorial posting page. The user may select at least one editing draft from the editing draft box as the initial editing draft bound with the tutorial currently posted. The process is returned to the tutorial posting page after the initial editing draft is selected. At this time, an identification of the initial editing draft, for example, a draft id, may be displayed at the entrance of "binding editing draft" on the tutorial posting page. The first video bound with the initial editing draft is posted in response to receiving an operation of the user triggering a posting control on the tutorial posting page. In this way, other users can easily edit the multimedia resource based on the posted first video bound with the initial editing draft.

Figure 9:
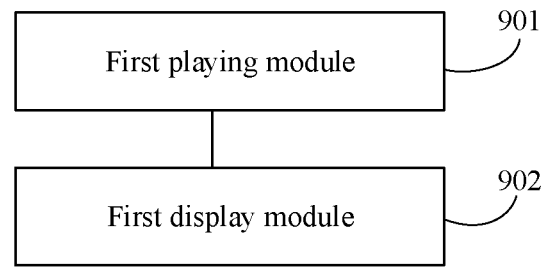
FIG. 9 is a schematic structural diagram of an apparatus for editing a multimedia resource according to an embodiment of the present disclosure.

Based on the same conception as the above method embodiments, an apparatus for editing a multimedia resource is further provided according to an embodiment of the present disclosure. Referring to FIG. 9, which is a schematic structural diagram of an apparatus for editing a multimedia resource according to an embodiment of the present disclosure. The apparatus includes a first playing module 901, and a first display module 902.

The first playing module 901 is configured to play a first video bound with an initial editing draft, where the first video shows a process of producing the initial editing draft, and the initial editing draft indicates an initial editing operation for an original multimedia material.

The first display module 902 is configured to display a multimedia-resource-editing operation page according to a target editing draft, in response to an editing triggering operation for the first video, where the target editing draft is obtained based on the initial editing draft, the target editing draft indicates a target editing operation for a target material, the target material corresponds to all or part of the original multimedia material, and the target editing operation includes all or part of the initial editing operation.

In an implementation, the apparatus further includes a second playing module and a third playing module.

The second playing module is configured to play a second video, where the second video is not bound with the initial editing draft, and the second video indicates an editing operation for a multimedia material.

The third playing module is configured to play the second video in a form of a floating window on the multimedia-resource-editing operation page, in response to an editing triggering operation for the second video.

In an implementation, the first display module includes a first determination sub-module, a display sub-module, a replacement sub-module, and a first display sub-module.

The first determination sub-module is configured to determine whether the initial editing draft is used, in response to the editing triggering operation for the first video.

The display sub-module is configured to display a multimedia-material selection page in a case of determining that the initial editing draft is used.

The replacement sub-module is configured to replace the original multimedia material in the initial editing draft with a multimedia material corresponding to a selection operation, in response to receiving the selection operation for a multimedia material displayed on the multimedia-material selection page, to obtain the target editing draft, where there is a correspondence between the multimedia material corresponding to the selection operation and the original multimedia material.

The first display sub-module is configured to display the multimedia-resource-editing operation page according to the target editing draft.

In an implementation, the apparatus further includes a fourth playing module.

The fourth playing module is configured to play the first video in a form of a floating window on the multimedia-resource-editing operation page, in a case of determining that the initial editing draft is not used, where the first video instructs the user to perform an editing operation on the multimedia-resource-editing operation page.

In an implementation, the apparatus further includes a display module.

The display module is configured to display the number of selected multimedia material, on the multimedia-material selection page. The number of selected multimedia material is determined based on the number of original multimedia material included in the initial editing draft. The number of selected multimedia material indicates the number of the multimedia material selected by the user.

In an implementation, the first video bound with the initial editing draft is posted based on a binding relationship between the first video and the initial editing draft.

In an implementation, the apparatus further includes a receiving module.

The receiving module is configured to receive an adjustment operation for at least one of the target material and the target editing operation, on the multimedia-resource-editing operation page.

In the apparatus for editing the multimedia resource according to the embodiments of the present disclosure, a first video bound with an initial editing draft is first played. The first video shows a process of producing the initial editing draft, and the initial editing draft indicates an initial editing operation for an original multimedia material. Then, a multimedia-resource-editing operation page is displayed according to a target editing draft in response to an editing triggering operation for the first video. The target editing draft is obtained based on the initial editing draft. The target editing draft indicates a target editing operation for a target material. The target material corresponds to all or part of the original multimedia material, and the target editing operation includes all or part of the initial editing operation. In the embodiments of the present disclosure, multimedia resources can be edited easily based on the initial editing draft bound with the first video, which lowers a threshold of editing multimedia resources, thereby improving user experience in editing multimedia resources.

In addition to the method and the apparatus described above, a computer-readable storage medium is further provided according to an embodiment of the present disclosure. The computer-readable storage medium stores instructions. The instructions, when executed by a terminal device, cause the terminal device to implement the method for editing the multimedia resource according to the embodiments of the present disclosure.

A computer program product is further provided according to an embodiment of the present disclosure. The computer program product includes a computer program or instructions. The computer program or instructions, when executed by a processor, implements the method for editing the multimedia resource according to the embodiments of the present disclosure.

Figure 10:
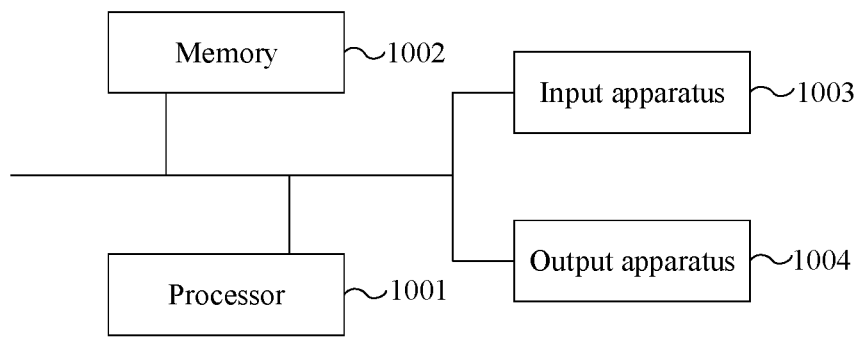
FIG. 10 is a schematic structural diagram of a device for editing a multimedia resource according to an embodiment of the present disclosure.

In addition, a device for editing the multimedia resource is further provided according to an embodiment of the present disclosure. As shown in FIG. 10, the device includes a processor 1001, a memory 1002, an input apparatus 1003 and an output apparatus 1004. The number of the processor 1001 in the device for editing multimedia resources may be one or more. For example, as shown in FIG. 10, the number of the processor is one. In some embodiments of the present disclosure, the processor 1001, the memory 1002, the input apparatus 1003 and the output apparatus 1004 may be connected to each other through a bus or other ways, and the connection through a bus is taken as an example in FIG. 10.

The memory 1002 may be configured to store a software program and a module. The processor 1001 runs the software program and the module stored in the memory 1002, to perform various functional applications and data processing of the device for editing multimedia resources. The memory 1002 may mainly include a program memory area and a data memory area. The program memory area may store an operating system, an application required by at least one function and the like. In addition, the memory 1002 may include a high-speed random access memory, and may further include a non-volatile memory, such as at least one disk storage device, a flash device or other volatile solid-state storage device. The input apparatus 1003 may be configured to receive inputted number or character information, and input a signal related to user settings and function control of the device for editing multimedia resources.

In the embodiments, the processor 1001 may load an executable file corresponding to the processes of one or more application programs into the memory 1002 according to the following instructions, and the processor 1001 runs the application program stored in the memory 1002, thereby achieving various functions in the electronic device described above.

It should be noted that the terms "first", "second" and the like in the description are used for distinguishing an entity or operation from another entity or operation, rather than requiring or implying an actual relationship or order between these entities or operations. In addition, terms of "include", "comprise" or any other variants are intended to be non-exclusive. Therefore, a process, method, article or device including a series of elements includes not only the elements but also other elements that are not enumerated, or also include the elements inherent for the process, method, article or device. Unless expressively limited otherwise, an element defined by a statement of "comprising (including) one . . . " does not exclude a case that other similar elements exist in the process, method, article or device including the element.

The above are only specific implementations of the present disclosure, so that those skilled in the art can understand or implement the present disclosure. It is apparent for those skilled in the art to make many modifications to these embodiments. The general principle defined herein may be applied to other embodiments without departing from the scope of the present disclosure. Therefore, the present disclosure is not limited to the embodiments illustrated herein, but should be defined by the broadest scope consistent with the principle and novel features disclosed herein.

The invention claimed is:

1. A method for editing a multimedia resource, comprising:
    playing a first video bound with an initial editing draft, wherein the first video shows a process of producing the initial editing draft, and the initial editing draft indicates an initial editing operation for an original multimedia material; and
    displaying a multimedia-resource-editing operation page according to a target editing draft, in response to an editing triggering operation for the first video, wherein the target editing draft is obtained based on the initial editing draft, the target editing draft indicates a target editing operation for a target material, the target material corresponds to all or a part of the original multimedia material, the target editing operation comprises all or a part of the initial editing operation, and the target material and the target editing operation are displayed on the multimedia-resource-editing operation page,
    wherein the displaying the multimedia-resource-editing operation page according to the target editing draft, in response to the editing triggering operation for the first video comprises:
        determining whether the initial editing draft is used, in response to the editing triggering operation for the first video;
        displaying a multimedia-material selection page, in a case of determining that the initial editing draft is used;
        replacing the original multimedia material in the initial editing draft with a multimedia material corresponding to a selection operation, in response to receiving a selection operation for a multimedia material displayed on the multimedia-material selection page, to obtain the target editing draft, wherein there is a correspondence between the multimedia material corresponding to the selection operation and the original multimedia material; and
        displaying the multimedia-resource-editing operation page according to the target editing draft.

2. The method according to claim 1, further comprising:
    playing a second video, wherein the second video is not bound with the initial editing draft, and the second video indicates an editing operation for a multimedia material; and
    playing the second video in a form of a floating window on the multimedia-resource-editing operation page, in response to an editing triggering operation for the second video.

3. The method according to claim 1, further comprising:
    playing the first video in a form of a floating window on the multimedia-resource-editing operation page, in a case of determining that the initial editing draft is not used, wherein the first video instructs a user to perform an editing operation on the multimedia-resource editing operation page.

4. The method according to claim 1, wherein before the replacing the original multimedia material in the initial editing draft with a multimedia material corresponding to a selection operation, in response to receiving a selection operation for a multimedia material displayed on the multimedia-material selection page, to obtain the target editing draft, the method further comprises:
    displaying the number of selected multimedia material on the multimedia-material selection page; wherein the number of selected multimedia material is determined based on the number of original multimedia material comprised in the initial editing draft, and the number of selected multimedia material indicates the number of multimedia material selected by the user.

5. The method according to claim 1, wherein the first video bound with the initial editing draft is posted based on a binding relationship between the first video and the initial editing draft.

6. The method according to claim 1, wherein after the displaying the multimedia-resource-editing operation page according to the target editing draft, the method further comprises:
    receiving an adjustment operation for at least one of the target material and the target editing operation, on the multimedia-resource-editing operation page.

7. A non-transitory computer-readable storage medium storing instructions, wherein the instructions, when executed by a terminal device, cause the terminal device to:
    play a first video bound with an initial editing draft, wherein the first video shows a process of producing the initial editing draft, and the initial editing draft indicates an initial editing operation for an original multimedia material; and
    display a multimedia-resource-editing operation page according to a target editing draft, in response to an editing triggering operation for the first video, wherein the target editing draft is obtained based on the initial editing draft, the target editing draft indicates a target editing operation for a target material, the target material corresponds to all or a part of the original multimedia material, the target editing operation comprises all or a part of the initial editing operation, and the target material and the target editing operation are displayed on the multimedia-resource-editing operation page,
    wherein the instructions, when executed by a terminal device, cause the terminal device to:
        determine whether the initial editing draft is used, in response to the editing triggering operation for the first video;
        display a multimedia-material selection page, in a case of determining that the initial editing draft is used;
        replace the original multimedia material in the initial editing draft with a multimedia material corresponding to a selection operation, in response to receiving a selection operation for a multimedia material displayed on the multimedia-material selection page, to obtain the target editing draft, wherein there is a correspondence between the multimedia material corresponding to the selection operation and the original multimedia material; and
        display the multimedia-resource-editing operation page according to the target editing draft.

8. The non-transitory computer-readable storage medium according to claim 7, wherein the instructions, when executed by a terminal device, cause the terminal device further to:
    play a second video, wherein the second video is not bound with the initial editing draft, and the second video indicates an editing operation for a multimedia material; and
    play the second video in a form of a floating window on the multimedia-resource-editing operation page, in response to an editing triggering operation for the second video.

9. The non-transitory computer-readable storage medium according to claim 7, wherein the instructions, when executed by a terminal device, cause the terminal device further to:
    play the first video in a form of a floating window on the multimedia-resource-editing operation page, in a case of determining that the initial editing draft is not used, wherein the first video instructs a user to perform an editing operation on the multimedia-resource editing operation page.

10. The non-transitory computer-readable storage medium according to claim 7, wherein the instructions, when executed by a terminal device, cause the terminal device to:
    display the number of selected multimedia material on the multimedia-material selection page before the original multimedia material in the initial editing draft is replaced with a multimedia material corresponding to a selection operation; wherein the number of selected multimedia material is determined based on the number of original multimedia material comprised in the initial editing draft, and the number of selected multimedia material indicates the number of multimedia material selected by the user.

11. The non-transitory computer-readable storage medium according to claim 7, wherein the first video bound with the initial editing draft is posted based on a binding relationship between the first video and the initial editing draft.

12. The non-transitory computer-readable storage medium according to claim 7, wherein the instructions, when executed by a terminal device, cause the terminal device to:
    receive an adjustment operation for at least one of the target material and the target editing operation, on the multimedia-resource-editing operation page, after the multimedia-resource-editing operation page is displayed according to the target editing draft.

13. A device, comprising:
    a memory;
    a processor; and
    a computer program stored in the memory and executable on the processor,
    wherein the computer program, when executed by the processor, causes the processor to:
    play a first video bound with an initial editing draft, wherein the first video shows a process of producing the initial editing draft, and the initial editing draft indicates an initial editing operation for an original multimedia material; and
    display a multimedia-resource-editing operation page according to a target editing draft, in response to an editing triggering operation for the first video, wherein the target editing draft is obtained based on the initial editing draft, the target editing draft indicates a target editing operation for a target material, the target material corresponds to all or a part of the original multimedia material, the target editing operation comprises all or a part of the initial editing operation, and the target material and the target editing operation are displayed on the multimedia-resource-editing operation page,
    wherein the computer program, when executed by the processor, causes the processor to:
    determine whether the initial editing draft is used, in response to the editing triggering operation for the first video;
    display a multimedia-material selection page, in a case of determining that the initial editing draft is used;
    replace the original multimedia material in the initial editing draft with a multimedia material corresponding to a selection operation, in response to receiving a selection operation for a multimedia material displayed on the multimedia-material selection page, to obtain the target editing draft, wherein there is a correspondence between the multimedia material corresponding to the selection operation and the original multimedia material; and
    display the multimedia-resource-editing operation page according to the target editing draft.

14. The device according to claim 13, wherein the computer program, when executed by the processor, causes the processor further to:
    play a second video, wherein the second video is not bound with the initial editing draft, and the second video indicates an editing operation for a multimedia material; and
    play the second video in a form of a floating window on the multimedia-resource-editing operation page, in response to an editing triggering operation for the second video.

15. The device according to claim 13, wherein the computer program, when executed by the processor, causes the processor to:
    play the first video in a form of a floating window on the multimedia-resource-editing operation page, in a case of determining that the initial editing draft is not used, wherein the first video instructs a user to perform an editing operation on the multimedia-resource editing operation page.

16. The device according to claim 13, wherein the computer program, when executed by the processor, causes the processor to:
    display the number of selected multimedia material on the multimedia-material selection page before the original multimedia material in the initial editing draft is replaced with a multimedia material corresponding to a selection operation; wherein the number of selected multimedia material is determined based on the number of original multimedia material comprised in the initial editing draft, and the number of selected multimedia material indicates the number of multimedia material selected by the user.

17. The device according to claim 13, wherein the first video bound with the initial editing draft is posted based on a binding relationship between the first video and the initial editing draft.

* * * * *